US008741058B1

United States Patent
Easton et al.

(10) Patent No.: US 8,741,058 B1
(45) Date of Patent: Jun. 3, 2014

(54) BY-PRODUCT TREATMENT VIA CALCIUM POLYSULFIDE

(71) Applicants: James Theodore Easton, Steamboat Springs, CO (US); James A. Papp, Steamboat Springs, CO (US)

(72) Inventors: James Theodore Easton, Steamboat Springs, CO (US); James A. Papp, Steamboat Springs, CO (US)

( * ) Notice: Subject to any disclaimer, the term of this patent is extended or adjusted under 35 U.S.C. 154(b) by 0 days.

(21) Appl. No.: 13/801,887

(22) Filed: Mar. 13, 2013

Related U.S. Application Data

(60) Provisional application No. 61/610,428, filed on Mar. 13, 2012.

(51) Int. Cl.
| | | |
|---|---|---|
| *C04B 22/14* | (2006.01) | |
| *B09B 3/00* | (2006.01) | |
| *C04B 18/08* | (2006.01) | |
| *C04B 18/00* | (2006.01) | |
| *C04B 18/04* | (2006.01) | |
| *C04B 18/18* | (2006.01) | |
| *C04B 18/30* | (2006.01) | |
| *C04B 7/00* | (2006.01) | |
| *A62D 3/00* | (2006.01) | |
| *A62D 3/30* | (2007.01) | |
| *A62D 3/33* | (2007.01) | |
| *A62D 101/00* | (2007.01) | |
| *A62D 101/08* | (2007.01) | |

(52) U.S. Cl.
CPC ............... *C04B 22/14* (2013.01); *C04B 18/00* (2013.01); *C04B 18/04* (2013.01); *C04B 18/0463* (2013.01); *C04B 18/0472* (2013.01); *C04B 18/08* (2013.01); *C04B 18/18* (2013.01); *C04B 18/30* (2013.01); *C04B 7/00* (2013.01); *A62D 3/00* (2013.01); *A62D 3/30* (2013.01); *A62D 3/33* (2013.01); *B09B 3/0041* (2013.01); *A62D 2101/00* (2013.01); *A62D 2101/08* (2013.01); *B09B 2220/06* (2013.01); *Y10S 106/01* (2013.01)

USPC ........... 106/815; 106/705; 106/710; 106/789; 106/791; 106/DIG. 1; 588/249.5; 588/252; 588/256; 588/257

(58) Field of Classification Search
CPC ............. A62D 3/00; A62D 3/30; A62D 3/33; A62D 2101/00; A62D 2101/08; B09B 3/0041; B09B 2220/06; C04B 7/00; C04B 18/00; C04B 18/04; C04B 18/08; C04B 18/18; C04B 18/30; C04B 18/0463; C04B 18/0472; C04B 22/14
USPC ................. 106/705, 710, 789, 791, 799, 815, 106/DIG. 1; 588/249.5, 252, 256, 257
See application file for complete search history.

(56) References Cited

U.S. PATENT DOCUMENTS

| | | | |
|---|---|---|---|
| 4,243,563 A | 1/1981 | Ferm | |
| 5,560,893 A | 10/1996 | Okino et al. | |
| 6,638,204 B2 * | 10/2003 | Mizutani et al. | 588/318 |
| 7,144,362 B2 * | 12/2006 | Roper, Jr. | 588/257 |
| 7,754,465 B2 | 7/2010 | Papp et al. | |
| 2006/0094921 A1 * | 5/2006 | Roper | 588/257 |
| 2006/0239881 A1 | 10/2006 | Nagayasu et al. | |
| 2010/0145130 A1 | 6/2010 | McMullough | |

FOREIGN PATENT DOCUMENTS

WO    2007020205 A1    2/2007

* cited by examiner

*Primary Examiner* — Anthony J Green
(74) *Attorney, Agent, or Firm* — Crawford Maunu PLLC

(57) ABSTRACT

By-product materials are processed to mitigate undesirable effects. In some embodiments, industrial waste by-products are recycled using calcium polysulfide and used in building materials. In certain implementations, toxins are rendered non-viable as human pathogens by reaction with calcium polysulfide to create non-soluble sulfide crystals locked in the material as hydration is completed. The sulfides are not soluble in water and are locked into position within the resulting hydrate material, which mitigates escape of or changes of state in the toxins.

20 Claims, 2 Drawing Sheets

BY-PRODUCT TREATMENT VIA CALCIUM POLYSULFIDE

This application claims the benefit of U.S. Provisional Application No. 61/610,428, filed Mar. 13, 2012 which is incorporated herein by reference in its entirety.

Aspects of various embodiments are directed to the treatment of by-products using calcium polysulfide.

BACKGROUND

A variety of processes are generated by-products that are harmful or otherwise undesirable. For example, the production of electricity by coal fired production plants creates by-product materials containing toxic waste. As coal is burned, toxic heavy metals such as Mercury, Arsenic, Cadmium, Lead and other substances become gases. Molecules of these gases cool in exhaust systems and collect with fine ash particles to make fly ash. Heavy ashes fall during coal combustion to create bottom ash. These materials are often stored in piles or in ponds at production facilities. The presence of these sites creates a potential hazard to human populations, at least in part due to the ability of toxins to dissolve in water supplies. Once in water supplies, the toxins can become a threat.

As another example, slag piles and other by-products of industrial processes such as mining, metal smelting and refining can pose potential problems. For instance, toxic lead, arsenic, copper, selenium and other contamination may be generated from such processes. These and other matters have presented challenges to managing by-products of a variety of applications.

SUMMARY

Various example embodiments are directed to methods and apparatuses for treating waste by-products.

In accordance with one or more example embodiments, negatively-charged calcium polysulfide is reacted with toxins to create non-soluble sulfide-based crystals. In some implementations, these non-soluble crystals are locked in a material as hydration is completed. The crystals effectively render the toxins insoluble in water, mitigating issues relating to water-borne contamination.

Another example embodiment is directed to a method as follows. A by-product type substance is rendered insoluble in water by mixing the by-product in water with calcium polysulfide, forming negatively-charged sulfur and positively-charged ions, the positively-charged ions including a material from the by-product substance, and creating non-soluble sulfide crystals by reacting the negatively-charged sulfur with the positively-charged ions. A calcium silicate hydrate is formed with the non-soluble sulfide crystals, and the calcium silicate hydrate is used to form the concrete-based material.

The above discussion/summary is not intended to describe each embodiment or every implementation of the present disclosure. The figures and detailed description that follow also exemplify various embodiments.

BRIEF DESCRIPTION OF THE FIGURES

Various example embodiments may be more completely understood in consideration of the following detailed description in connection with the accompanying drawings, in which.

Figure 1:
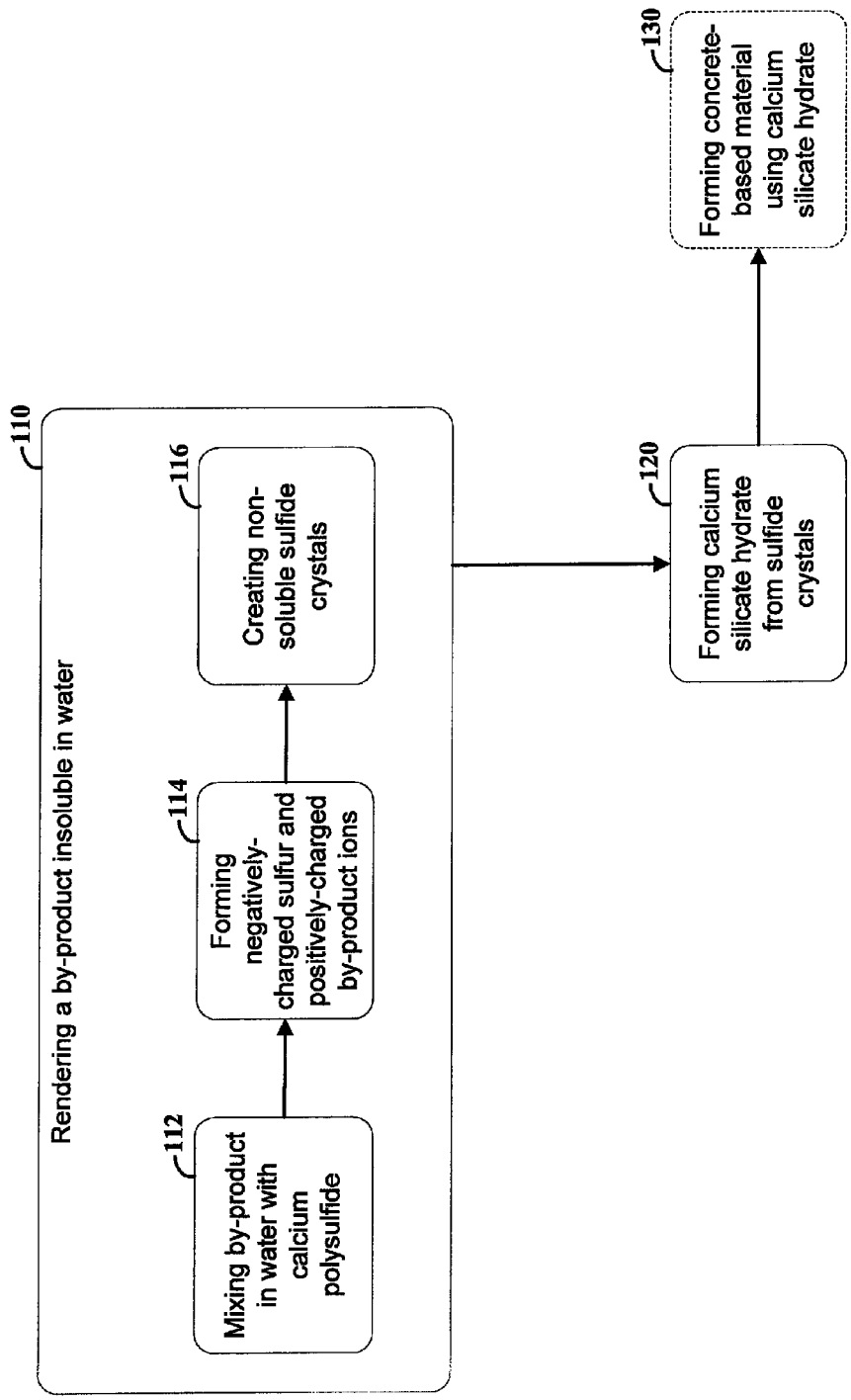
FIG. 1 shows a method for treating a by-product, in accordance with an example embodiment.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving the treatment of toxins and/or other types of components desirably rendered insoluble, and the generation of building materials using resulting treated products. While not necessarily so limited, various aspects may be appreciated through a discussion of examples using this context.

Various example embodiments are directed to manufacturing building materials such as concrete building materials by recycling industrial waste by-products utilizing calcium polysulfide. In accordance with one or more embodiments, it has been discovered/recognized that toxins are rendered non-viable as human pathogens by reacting the toxins to create non-soluble sulfide crystals locked in a hydrate material as hydration is completed, and further that the resulting material can be used in concrete-type products. The sulfides are not soluble in water and are locked into position within the hydrate material without the ability to readily escape or change in state. This approach may, for example, be used to mitigate or eliminate the ability of the toxin to dissolve into water and travel into ground water supplies. The resulting crystals are implemented in a building product.

In some embodiments, a building product is generated as follows from a coal-fired electricity production plant. As the coal is burned, toxic heavy metals such as Mercury, Arsenic, Cadmium, Lead and other substances become gases, which collect with fine ash particles to make fly ash upon cooling. Heavy ashes fall during coal combustion to create bottom ash. These materials may, for example, be stored in piles or in ponds at production facilities. The bottom ash is reacted with a negatively charged dianion of sulfur, S (2−), in a highly alkaline solution, Calcium Polysulfide, and locked in a resulting crystal.

In other embodiments, a building product is generated from one or more of slag piles and other by-products, as may be formed during mining, metal smelting and refining. The slag and/or other by-products is/are reacted with a negatively charged dianion of sulfur, S (2−), in a highly alkaline solution, Calcium Polysulfide, and locked in a resulting crystal. Such approaches can be used to render heavy metals insoluble in water. These heavy metals can be bonded with negatively-charged Sulfur ions in an alkaline solution using calcium polysulfide, yielding non-toxic metal sulfides.

Turning now to the figures, FIG. 1 shows a method for treating a by-product, in accordance with another example embodiment. At block 110, a by-product such as described herein is rendered insoluble in water as follows. The by-product is mixed with calcium polysulfide in water at block 112. At block 114, negatively-charged sulfur and positively-charged by-product ions are formed. Non-soluble sulfide crystals are formed at block 116, using the respective ions. After the by-product is rendered insoluble, the process continues at block 120, in which calcium silicate hydrate is formed from the sulfide crystals. Further, in accordance with one or more embodiments, the calcium silicate hydrate is then used at block 130 by forming a concrete-based material therefrom.

Figure 2:
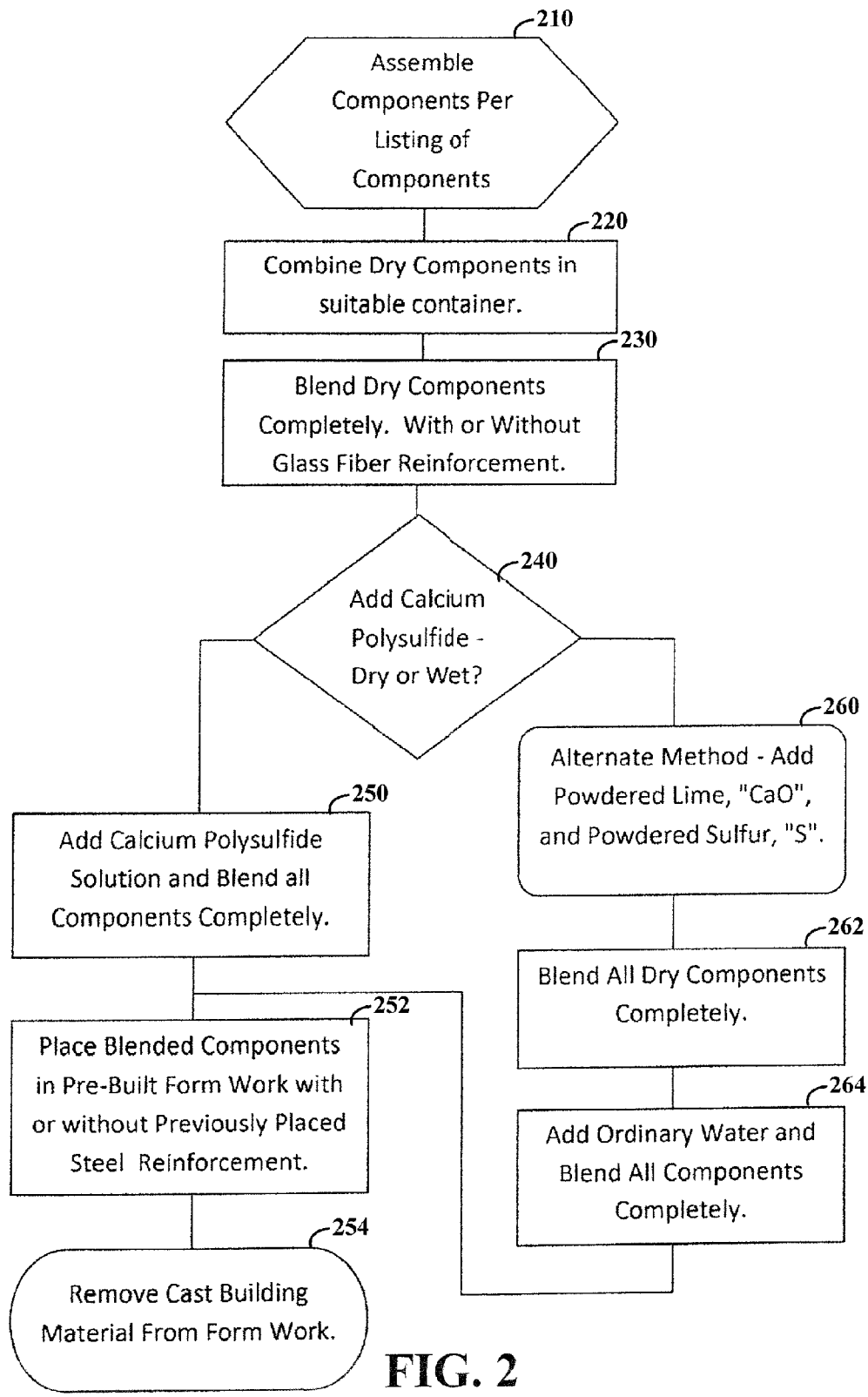
FIG. 2 shows a method for forming a concrete-based material, in accordance with another example embodiment.

FIG. 2 shows a method for forming a concrete-based material, in accordance with another example embodiment. At block 210, components are assembled for making a concrete-based product, such as by forming a water-insoluble material as described herein or shown in FIG. 1. At block 220, dry components from block 210 are combined in a container, and the components are blended at block 230 (with or without glass reinforcement). Calcium Polysulfide is added at block 240. If the Calcium Polysulfide is wet at block 240, the solution with calcium polysulfide is blended with the components at block 250, and placed in a form (e.g., with or without reinforcement) at block 252. The material is then cast in the form and removed at block 254.

If the calcium polysulfide is not wet at block 240, powdered lime (CaO) and powdered sulfur (S) are added at block 260. The dry components are blended at block 262, and water is added with all components being blended completely at block 264. The process then continues as described above, at block 252.

In one or more embodiments such as those described above, Calcium Polysulfide is degraded to create Calcium Hydroxide and elemental Sulfur in aqueous solution. Negatively-charged Sulfur ions are bonded to positively-charged ions of toxic substances (e.g., in highly alkaline aqueous solution) to create sulfides. Sulfides may, for example, be similar to sulfide ores that are commercially mined for use in extracting or smelting metals for industrial use.

By way of example, one such approach involves reacting elemental Mercury with sulfide to create Mercury Sulfide, Cinnabar:

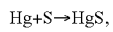

in which positive Mercury ions bond to negative Sulfur ions. In the Sulfide form, the Mercury rendered insoluble in water and does not pose a threat to biological organisms.

In other embodiments, a reaction similar to that discussed above is carried out with other toxic or potentially toxic substance that presents itself as a positively charged ion in an oxidated state (such as when placed in hydroxide solution). The toxic substances are reacted to form Sulfides, and the crystallized substance is locked into Calcium Silicate Hydrate. In some embodiments, the Calcium Silicate Hydrate can then be implemented in a concrete-based construction component (e.g., with mobile concrete production facilities, concrete production plants or on construction sites).

Various embodiments are directed to a high strength, light weight material with water and chemical resistance properties. The material is made from industrial by-products such as toxic waste that has been remediated or rendered non-viable as a human pathogen. In some implementations, the material is molded into and/or otherwise used in building materials such as concrete masonry units, precast concrete structural systems, landscape accents, highways, roads, bridges, traffic barriers, concrete safety liners for fracking wells, steel reinforcement, foundations, cold weather materials with mitigated expansion and contraction characteristics, and other concrete-type products. Such materials can be used in lieu of cement, mitigating cement-based production and use matters.

In various embodiments, a Calcium Silicate Hydrate as, produced herein is formed into concrete building materials, poured as slabs and used in detailed casting and form work. The material can create buildings, stadiums, highways, bridges, roads, curbs, sidewalks, foundations, walls, fences, traffic barriers, statues, monuments, modular construction systems, chemically resistant applications such as slabs in oil refineries and chemical production plants, and other products such as discussed herein and in the underlying provisional application to which benefit is claimed.

In accordance with such concrete-type product manufacturing embodiments, one or more of the following components are mixed in various proportions to create concrete mix designs of various strengths and consistencies for use in construction materials:

1. Calcium Polysulfide, CaSx, in aqueous solution
2. Class F Fly Ash (a pozzalan)
3. Class C Fly Ash (a pozzolan)
4. Sand
5. Volcanic Rock (a pozzolan also known as cinders, pumice)
6. Pulverized Slag (a pozzolan)
7. Cement
8. Crushed Aggregate Calcium Polysulfide solutions are substituted for water to present a negatively charged ion of Sulfur in a highly alkaline solution, which is used to facilitate the bonding of toxins with Sulfur and the creation of non-soluble Sulfides. Calcium Polysulfide is added in various amounts and with various proportions of water added to the solution, to suit particular applications. The Calcium Polysulfide is degraded to create Calcium Hydroxide and Sulfur. The Calcium Hydroxide becomes an integral part of Calcium Silicate Hydrate through reaction with Silicate Hydroxide.

The class F Fly Ash is a by-product of coal fired electrical production and is high in silicates. The class C Fly Ash is also a by-product of coal fired electrical production. Class C Fly Ash provides lime, CaO, and silicates. Fly Ash can be added in various amounts. This is a pozzolanic material that reacts with Calcium in Hydroxide solution to create Calcium Silicate Hydrate. The lime and CaO, present in the Class C Fly Ash, "slakes" with water in the Calcium Polysulfide solution to create Calcium Hydroxide from the water molecules. In some implementations, most or all water is eliminated from the mix during this reaction. The remaining silicate content of the Class C Fly Ash is bonded to form Calcium Silicate Hydrate as described above. Class F Fly Ash can be used to improve the workability of the material in form work by adding glassy silicates.

The sand provides a fine aggregate and is high in silicates. The sand is used as a filler in the mix to increase bonding properties. Sand can be added in various amounts to effect strength and consistency of the mix design. The volcanic rock is a natural by-product of high temperature reactions and is high is silicates. Volcanic rock is a pozzolanic material with the ability to chemically bond to Calcium Silicate Hydrate (e.g., rather than just be encased in cementitous material). Pulverized slag is a by-product (e.g., potentially toxic) of industrial metal smelting and is high in silicates. Slag can also be high in lime depending on the type of ore that was smelted to create the specific slag accumulation. Slag is a pozzolanic material that facilitates reactions to create Calcium Silicate Hydrate. The cement may, for example, be Ordinary Portland Cement, which includes a powder that can be mixed with water, sand and crushed rock to form concrete. Crushed aggregate is used in concrete mix designs as filler and to increase the compressive strength by including high strength materials with the cementing agents. Crushed aggregate may be of various sizes and various types in various amounts.

Different types of volcanic rock and slag aggregate can be added in different sizes to effect strength, texture, color and final weight of the material.

In certain embodiments, the components of the method come together to supply Sulfur in a negatively charged ion to bond with positively charged toxic ions turning them into non-harmful sulfides. The Sulfides are locked in a concrete-like material, such as by a pozzolanic reaction and/or as follows:

in which Calcium Hydroxide reacts with Silicate Hydroxide to form Calcium Silicate Hydrate. The silicates mix with hydroxide to create silicate hydroxide. The Calcium Hydroxide from the Calcium Polysulfide solution reacts with the Silicate Hydroxide to create Calcium Silicate Hydrate.

Accordingly, various embodiments are directed to rendering toxins harmless as human pathogens with the use of Calcium Polysulfide, and bonding resulting components together to create practical construction materials. Different materials can be mixed in different amounts with Calcium Polysulfide to eliminate heavy metal toxins and create building materials of various strengths, sizes, uses, colors, textures and other characteristics.

The resulting concrete-based materials can be implemented in a variety of manners, such as by mixing the components with water and placing the wet material into form work similar to normal concrete construction methods. In some embodiments, dry components can also be packed into forms and liquid Calcium Polysulfide applied to the packed material to cause a chemical reaction. In certain embodiments, all components are mixed in dry form including powdered Calcium Oxide and powdered Sulfur in a premixed form, and water is added to facilitate reactions such as described above. The dry Calcium Oxide and Sulfur together with water constitute Calcium Polysulfide, and the negatively charged ion of Sulfur will be presented in highly alkaline aqueous solution.

In some embodiments, calcium polysulfide is injected in-situ into ground containing high levels of silicate materials and used to create concrete, such as to provide barriers to block the movement of underground insects such as termites.

In certain embodiments, structures using variations of lime concrete that is based upon a pozzolanic reaction are strengthened using approaches as described herein to foam a cement-like material. The materials mimic characteristics of and adhere to pozzolanic mixtures, using a pozzolanic reaction as described herein.

In other embodiments, concrete-type products are formed underwater using approaches as described herein. Waterproof-type and chemical resistant-type properties of calcium silicate hydrate facilitate the underwater formation. Water is pulled into the mass until all lime has slaked to create Calcium Hydroxide. The Calcium Hydroxide is used to bond silicates to create Calcium Silicate Hydrate, with the resulting material being insoluble in (and/or not affected by) water.

Based upon the above discussion and illustrations, those skilled in the art will readily recognize that various modifications and changes may be made to the various embodiments without strictly following the exemplary embodiments and applications illustrated and described herein. For example, a variety of different types of toxins can be reacted with calcium polysulfide, and used to lock in and render a substance non-soluble in water. Still other embodiments are directed to one or more aspects as described or shown in the figures in the U.S. Provisional Patent Application Ser. No. 61/610,428, to which priority is claimed and which is fully incorporated herein by reference. Such modifications do not depart from the true spirit and scope of various aspects of the invention, including aspects set forth in the claims.

What is claimed is:

1. A method comprising:
   rendering a by-product substance insoluble in water by
      mixing the by-product in water with calcium polysulfide,
      forming negatively-charged sulfur and positively-charged ions, the positively-charged ions including a material from the by-product substance,
      creating non-soluble sulfide crystals by reacting the negatively-charged sulfur with the positively-charged ions;
   forming a calcium silicate hydrate with the non-soluble sulfide crystals; and
   forming a concrete-based material with the calcium silicate hydrate.

2. The method of claim 1, wherein the by-product includes fly ash.

3. The method of claim 2, wherein forming the concrete-based material includes forming a concrete-based material that is substantially devoid of Portland cement.

4. The method of claim 2, wherein creating non-soluble sulfide crystals includes forming non-soluble Selenium utilizing the fly ash.

5. The method of claim 2, wherein the fly ash includes class F and class C fly ash.

6. The method of claim 2, wherein the fly ash includes aluminum oxide.

7. The method of claim 1, wherein forming the concrete-based material includes utilizing at least one of volcanic rock, pumice and a pozzolan.

8. The method of claim 1, wherein forming negatively-charged sulfur and positively-charged ions includes forming calcium hydroxide utilizing the calcium polysulfide and bonding hydrogen ions from the calcium hydroxide with the negatively-charged sulfur to create hydrogen sulfide.

9. The method of claim 8, wherein forming the calcium silicate hydrate includes utilizing the hydrogen sulfide with heavy metal ions to produce non-soluble sulfide compounds.

10. The method of claim 1, wherein the by-product includes fly ash, and forming the calcium silicate hydrate includes reacting material from the fly ash with calcium in a hydroxide.

11. The method of claim 10, wherein mixing the by-product in water with calcium polysulfide includes forming a calcium polysulfide solution, further including
   slaking the fly ash with water in the calcium polysulfide solution to create calcium hydroxide, and
   after the slaking, bonding remaining fly ash to form the calcium silicate hydrate.

12. The method of claim 11, wherein slaking the fly ash with water includes eliminating about all water from the solution via reaction with the fly ash.

13. The method of claim 1, wherein the by-product includes fly ash having lime, and wherein forming the concrete-based material includes slaking about all the lime in the by-product material with water.

14. The method of claim 1, wherein the by-product includes at least one of: human pathogens and slag.

15. The method of claim 1, further including, after forming the concrete-based material, in response to water introduced to a crack in the concrete-based material, interacting the concrete-based material with the water to form the concrete-based material in the crack.

16. A method for forming structural concrete, the method comprising:
- mixing fly ash with a solution including calcium polysulfide and water;
- forming negatively-charged sulfur and positively-charged hydrogen ions from the mixed fly ash and solution;
- creating non-soluble sulfide crystals by reacting the negatively-charged sulfur with the positively-charged ions;
- forming a calcium silicate hydrate with the non-soluble sulfide crystals; and
- forming a concrete-based material with the calcium silicate hydrate.

17. The method of claim 16, wherein forming the calcium silicate hydrate includes reacting calcium hydroxide with silicate hydroxide.

18. The method of claim 17, further including forming the calcium hydroxide by slaking the fly ash with water in the calcium polysulfide solution.

19. The method of claim 16, wherein the steps of forming negatively-charged sulfur and positively-charged hydrogen ions and creating the non-soluble sulfide crystals include
- forming calcium hydroxide utilizing the calcium polysulfide, and
- bonding hydrogen ions from the calcium hydroxide with the negatively-charged sulfur to create hydrogen sulfide.

20. An article of manufacture for use in forming a concrete-based material, the article of manufacture comprising:
- negatively-charged sulfur and positively-charged hydrogen ions in a mixture of fly ash with a solution including calcium polysulfide and water;
- non-soluble sulfide crystals including components of the negatively-charged sulfur reacted with the positively-charged ions; and
- a calcium silicate hydrate including the non-soluble sulfide crystals, the calcium silicate hydrate being configured and arranged to provide structural support by forming the concrete-based material.

* * * * *